US011447411B2

(12) United States Patent
Huang et al.

(10) Patent No.: US 11,447,411 B2
(45) Date of Patent: Sep. 20, 2022

(54) METHODS AND APPARATUSES FOR FACILITATING PURIFICATION OF SLUDGE AND TAILING

(71) Applicant: Royal Biotech Inc, Beverly Hills, CA (US)

(72) Inventors: Philip Huang, Westlake Village, CA (US); E-Ray Huang, Thousand Oaks, CA (US); En I Tu, Richmond (CA); Guozhi Lin, Changsha (CN)

(73) Assignee: ROYAL BIOTECH INC, Beverly Hills, CA (US)

( * ) Notice: Subject to any disclaimer, the term of this patent is extended or adjusted under 35 U.S.C. 154(b) by 282 days.

(21) Appl. No.: 16/813,429

(22) Filed: Mar. 9, 2020

(65) Prior Publication Data

US 2021/0206678 A1    Jul. 8, 2021

Related U.S. Application Data

(60) Provisional application No. 62/957,613, filed on Jan. 6, 2020.

(51) Int. Cl.
*C02F 9/00* (2006.01)
*C02F 11/18* (2006.01)
(Continued)

(52) U.S. Cl.
CPC ............ *C02F 9/00* (2013.01); *C02F 11/02* (2013.01); *C02F 11/127* (2013.01);
(Continued)

(58) Field of Classification Search
CPC .......... C02F 9/00; C02F 11/02; C02F 11/127; C02F 11/128; C02F 11/143; C02F 11/185; C02F 2209/40; C02F 2301/063; C02F 2303/04; C02F 1/283; C02F 1/32; C02F 1/76; C02F 11/04; C02F 11/18;
(Continued)

(56) References Cited

U.S. PATENT DOCUMENTS 2,874,118 A  *  2/1959  Albertsen ............. C02F 1/5281
                                                   210/512.1
4,031,006 A  *  6/1977  Ramirez ................. B04C 9/00
                                                   210/512.1
(Continued)

*Primary Examiner* — Nam X Nguyen
*Assistant Examiner* — Ekandra S. Miller-Cruz

(57) ABSTRACT

Disclosed herein is an apparatus for facilitating purification of sludge and tailing, in accordance with some embodiments. Accordingly, a sedimentation unit receives sludge and tailing in a first tank, separates wastewater from the sludge and the tailing, and transfers the wastewater from the first tank to a second tank. Further, a centrifugal unit creates a vortex in the wastewater. Further, a thermal hydrolysis unit coagulates a second impurity of the wastewater using coagulants and transfers the wastewater from the second tank to a (Continued)

third tank. Further, a digesting unit digests a macromolecule of the wastewater into a compound and transfers the wastewater from the third tank to a fourth tank. Further, a nutrient removal unit filters the wastewater from the compound and transfers the wastewater from the fourth tank to a fifth tank. Further, a reservoir unit disinfects the wastewater and stores the wastewater in the fifth tank.

12 Claims, 12 Drawing Sheets

(51) Int. Cl.
*C02F 11/128* (2019.01)
*C02F 11/127* (2019.01)
*C02F 11/02* (2006.01)
*C02F 11/143* (2019.01)

(52) U.S. Cl.
CPC ............ *C02F 11/128* (2013.01); *C02F 11/143* (2019.01); *C02F 11/185* (2013.01); *C02F 2209/40* (2013.01); *C02F 2301/063* (2013.01); *C02F 2303/04* (2013.01)

(58) Field of Classification Search
CPC ............ C02F 2001/007; C02F 2103/10; C02F 2209/006; C02F 2209/02; C02F 2209/03; C02F 2209/08
USPC .......................................................... 210/609
See application file for complete search history.

(56) References Cited

U.S. PATENT DOCUMENTS

| | | | |
|---|---|---|---|
| 5,124,034 A * | 6/1992 | Maness | B01D 21/08 210/207 |
| 5,972,220 A | 10/1999 | Bailey | |
| 7,101,482 B2 | 9/2006 | Chauzy et al. | |
| 7,494,592 B2 | 2/2009 | Deskins | |
| 8,465,645 B2 * | 6/2013 | Sassow | C05F 9/00 210/603 |
| 10,308,539 B2 | 6/2019 | Wright | |
| 2003/0116506 A1 * | 6/2003 | Lane | C02F 1/38 210/695 |
| 2016/0096756 A1 * | 4/2016 | Wright | C02F 11/121 210/702 |
| 2016/0107899 A1 * | 4/2016 | Goriawala | B01D 21/2427 210/804 |
| 2018/0370867 A1 | 12/2018 | Lu | |
| 2019/0276338 A1 * | 9/2019 | Wilson | B04B 5/10 |
| 2021/0147274 A1 * | 5/2021 | Cavanaugh | C02F 11/02 |

* cited by examiner

METHODS AND APPARATUSES FOR FACILITATING PURIFICATION OF SLUDGE AND TAILING

The current application claims a priority to the U.S. Provisional Patent application Ser. No. 62/957,613 filed on Jan. 6, 2020.

FIELD OF THE INVENTION

Generally, the present disclosure relates to the field of liquid purification or separation. More specifically, the present disclosure relates to methods and apparatuses for facilitating purification of sludge and tailing.

BACKGROUND OF THE INVENTION

The current urban sludge treatment method consumes energy, time, and manpower. They occupy a big land area and emit bad odor into the atmosphere. Further, the current urban sludge treatment method emits methane and thereby, causing secondary pollution-related problems.

The current sludge treatment tank is distributed to parallel-type thereby, occupying a large floor area. Further, urban sludge generated by every 1,000 people uses at least 4 acres of land for sand bed excluding others, so that the sludge is collected in layers.

Existing techniques for wastewater purification of municipal sludge and mine tailing are deficient with regard to several aspects. For instance, current techniques have high power consumption. Furthermore, current techniques have high carbon emissions into the atmosphere. Moreover, current techniques have a high cost of operation for wastewater purification.

Therefore, there is a need for improved methods, systems, apparatuses and devices for facilitating purification of sludge and tailing that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for facilitating purification of sludge and tailing, in accordance with some embodiments. Accordingly, the apparatus may include a sedimentation unit, a centrifugal unit, a thermal hydrolysis, a digesting unit, a nutrient removal unit, and a reservoir unit. Further, the sedimentation unit may be configured for receiving at least one of sludge and tailing in a first tank. Further, the sedimentation unit may be configured for separating wastewater from at least one of the sludge and the tailing based on density separation. Further, the sedimentation unit may be configured for transferring the wastewater from the first tank to a second tank based on the separating. Further, the second tank may include a primary compartment and a secondary compartment. Further, the primary compartment and the secondary compartment are longitudinally aligned. Further, the primary compartment may be fluidly coupled with the secondary compartment using a coupling opening. Further, the centrifugal unit may be operationally coupled with the sedimentation unit. Further, the centrifugal unit may be configured for creating a vortex in the wastewater based on the transferring of the wastewater from the first tank to the second tank. Further, the transferring may include dispensing of the wastewater from a plurality of outlets associated with the first tank corresponding to a plurality of flow pressures for creating a centrifugal effect in wastewater in the primary compartment. Further, the creating of the vortex may include flowing of the wastewater from the primary compartment to the secondary compartment though the coupling opening. Further, the vortex separates at least one first impurity from the wastewater. Further, the thermal hydrolysis unit may be operationally coupled with the centrifugal unit. Further, the thermal hydrolysis unit may be configured for coagulating at least one second impurity of the wastewater using a plurality of coagulants. Further, the thermal hydrolysis unit may be configured for transferring the wastewater from the second tank to a third tank based on the coagulating. Further, the digesting unit may be operationally coupled with the thermal hydrolysis unit. Further, the digesting unit may be configured for digesting at least one macromolecule of the wastewater into at least one compound based on the transferring of the wastewater from the second tank to the third tank. Further, the digesting unit may be configured for transferring the wastewater from the third tank to a fourth tank based on the digesting. Further, the nutrient removal unit may be operationally coupled with the digesting unit. Further, the nutrient removal unit may be configured for filtering the wastewater from the at least one compound based on the transferring of the wastewater from the third tank to the fourth tank. Further, the nutrient removal unit may be configured for transferring the wastewater from the fourth tank to a fifth tank. Further, the reservoir unit may be operationally coupled with the nutrient removal unit. Further, the reservoir unit may be configured for disinfecting the wastewater based on the transferring of the wastewater from the fourth tank to the fifth tank. Further, the reservoir unit may be configured for storing the wastewater in the fifth tank based on the disinfecting.

Further disclosed herein is a method of facilitating purification of sludge and tailing, in accordance with some embodiments. Accordingly, the method may include a step of receiving, using a sedimentation unit, at least one of sludge and tailing in a first tank. Further, the method may include a step of separating, using the sedimentation unit, wastewater from at least one of the sludge and the tailing based on density separation. Further, the method may include a step of transferring, using the sedimentation unit, the wastewater from the first tank to a second tank based on the separating. Further, the second tank may include a primary compartment and a secondary compartment. Further, the primary compartment and the secondary compartment are longitudinally aligned. Further, the primary compartment may be fluidly coupled with the secondary compartment using a coupling opening. Further, the method may include a step of creating, using a centrifugal unit, a vortex in the wastewater based on the transferring of the wastewater from the first tank to the second tank. Further, the transferring may include dispensing of the wastewater from a plurality of outlets associated with the first tank corresponding to a plurality of flow pressures for creating a centrifugal effect in wastewater in the primary compartment. Further, the creating of the vortex may include flowing of the wastewater from the primary compartment to the secondary compartment though the coupling opening. Further, the vortex separates at least one first impurity from the wastewater. Further, the method may include a step of coagulating, using a thermal hydrolysis unit, at least one second impurity of the wastewater using a plurality of coagulants. Further, the method may include a step of transferring, using the thermal hydrolysis unit, the wastewater from the second tank to a third tank based on the coagulating. Further, the method may include a step of digesting, using a digestion unit, at least one macromolecule of the wastewater into at least one compound based on the transferring of the wastewater from the second tank to the third tank. Further, the method may include a step of transferring, using the digesting unit, the wastewater from the third tank to a fourth tank based on the digesting. Further, the method may include a step of filtering, using a nutrient removal unit, the wastewater from the at least one compound based on the transferring of the wastewater from the third tank to the fourth tank. Further, the method may include a step of transferring, using the nutrient removal unit, the wastewater from the fourth tank to a fifth tank. Further, the method may include a step of disinfecting, using a reservoir unit, the wastewater based on the transferring of the wastewater from the fourth tank to the fifth tank. Further, the method may include a step of storing, using the reservoir unit, the wastewater in the fifth tank based on the disinfecting.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
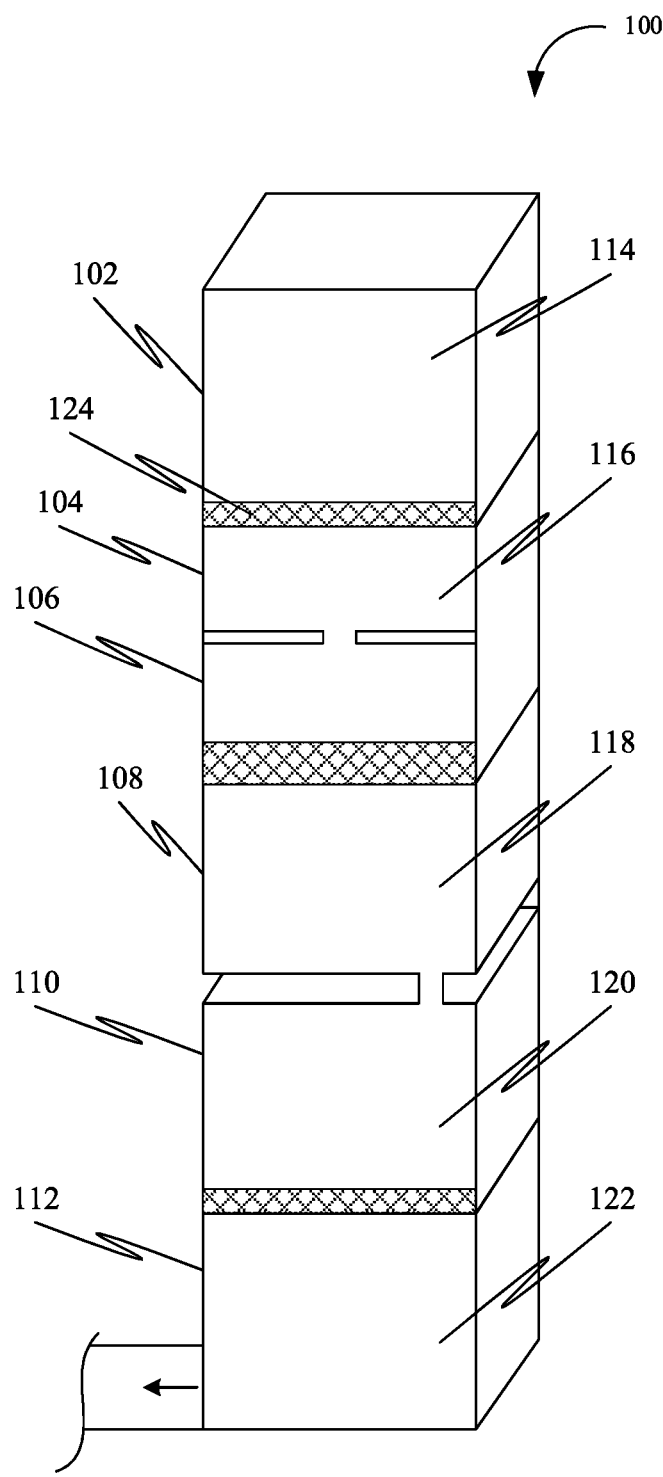
FIG. 1 is an apparatus for facilitating purification of sludge and tailing, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and apparatuses for facilitating purification of sludge and tailing, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, a public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or or possession of one or more embodied characteristics unique to the user (e.g. biometric variables such as but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. a temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes a method for facilitating wastewater purification of municipal sludge and mine tailing. Municipal sludge's water may have contents usually as high as 75% to 99.9% often including floats & oil esters, heavy metal pollution (copper, zinc, cadmium, chromium, etc.), chemical & organic contamination, such as polychlorinated biphenyls (PCBs) and dioxin, and microbial & parasitic pollution.

Further, the municipal sludge's water may include high doses of phosphorus, nitrogen, and potassium residues causing secondary pollution (acid rain and ozone layer depletion).

Further, the method for facilitating wastewater purification of municipal sludge and mine tailing may include a physical method, a chemical method, and a biological method. Further, the physical method may include storage, mixing, crushing, sedimentation, floatation, membrane method, activated carbon (sand) filtration. Further, the chemical method may include chemical conditioning, heat treatment, etc. Further, the biological method may include aerobic digestion, anaerobic fermentation, etc.

Further, the treatment of Sludge may be divided into 4 key sectors. Further, the 4 key sectors may include wastewater purification with microbiological pollution solution, heavy metal recovery/treatment (special metal recovery with the special method), chemical & organic pollution, and microbiological/virus pollution.

Further, an innovative solution may be the use of civil engineering design (concrete floor with porous block tile) combined with gravity and pressure principle. The use of water velocity pressure, perform energy-saving automated operation and "gate" switching system design, placing layers measured with sensors monitoring (such as sensors 1116) linked to computer control, in order to solve the problem. Further, utilizing natural power such as flow velocity, water pressure, and waterwheel. Further, the treated sludge may be used for agricultural uses.

First, the municipal sludge and mine tailing may be fed into a precipitation tank, thereby giving an opportunity for any solid matter to be precipitated. The oil floats and esters salvage away from the municipal sludge. Further, spiral classifiers may generate a heavy density mud and a low-density mud. Further, spiral classifiers may dry the concentration of the heavy density mud. Further, the low-density mud with wastewater may be fed from the ground (porous block tiles) into the bottom surface of two blocks: wasted water purification zone (WWP) and solid sludge treatment zone (SST). Further, at least one of the two blocks may be constructed into the center of the earth for an underground layering of the wastewater treatment process. Further, the construction of the blocks under the ground may create a negative pressure space. Further, the wasted water purification zone may include a treatment tank. Further, the treatment tank and the spiral classifiers may be shrouded in a negative pressure condition, resulting in the odor generated during the process of the wastewater purification, not being leaked.

Further, a software program may be employed to automatically calculate and control the sludge discharge speed, drops the pressure value, and controls the flow rate, thereby allowing sludge to be discharged into the treatment tank.

Further, the treatment tank may be distributed in a vertical configuration (in the direction of gravity) to reduce the occupied floor area. Further, the sludge may be collected in layers and thereby, allowing the gradual penetration of wastewater sludge by gravity down.

Further, treatment tanks may be in layers from the ground down named B1, B2, B3, B4, and B5. Further, the bottom of each layer may include filtering holes having the nebula distribution. Further, the diameter of the filtering holes may be different, such that the diameter gradually decreases from B1 to B5. Further, the filtering holes may allow the slitting of a mud-section depending upon the size, made of different shape cohesion (at a different level of space denial).

Second, using the drip bucket principle, slit moisture and finer sediments may automatically pass through the filtering holes to the lower layer. Each layer may be designed such that inclination having high side A and low side B. Further, the deposited sediment mud (which cannot fall through the hole in the layer) may be easily slid towards the lower side B. Further, the lower side B may include an attached broom, stuck at the B side (the lower part of the slope). The layer may be inclined to height A to lower the side B. Further, the broom may include eight claw punctures. Further, the high side A and the low side B may be designed such that the broom may be released from side A to side B on a track. Further, a handle with tension stainless steel spring may be locked at the side B.

Further, the sludge may continue moving towards a processing tank without the pressure of the sludge, but through the tension of the stainless steel spring. Further, the broom may be pushed back from the side B to the side A. Further, the mud layer deposited and concentrated at the side B may be moved to a collecting space.

The high side A may include a rope puller to push the broom. When the sludge flows into the processing tank from the treatment tank, a pressure may be generated (high pressure) in the sludge flow. Further, the pressure may start the rope puller, and a pull handle may be gradually pulled to the side A.

Calculated and designed decentralized mud pressure caused by the momentum of the sludge (power metering formed is greater than stainless steel spring tension).

By pushing the broom to move, the mud may block the filtering holes to make mud or wastewater drive smoothly and thereby, increasing the chance of falling the mud to the bottom. Further, the sludge and the wastewater may be lowered and may hit the wheel located at the side A and thereby, rotating the wheel. Further, the pulley rotates to pull the rope back.

Third, the inclined lower side B of the treatment tank may include a vertical wall. Further, the bottom surface of the treatment tank may allow digging a discharge port for the accumulation of the sludge via the vertical wall to a collection sludge tank. Further, the sludge may be discharged to the collection sludge tank with reduced water content.

Further, the sludge may flow into a pool when a vent designed gate closes automatically, thereby preventing the sludge to discharge directly. Further, the sludge may be discharged through a discharge pipe to the top sidewall of the pool. Further, the top sidewall of the pool (consisting of doors) may be automatically lowered by gravity impact (sludge discharge pressure gravity is greater than spring tension). Further, a tension spring may be attached to the top of the door, that may be automatically pulled up when the discharge of the sludge stops.

Fourth, each layer of the treatment tank may include a small interlayer. Further, the small interlayer may facilitate controlling the discharge port of the next layer and start switch of the push handle. Further, a small mezzanine level may be formed into a mountain shape (the middle side is high on both sides of the landslide). Further, small particles of sludge in the treatment tank may be concentrated in two small reservoirs on both sides of the small interlayer. Further, the two small reservoirs may include a platen door.

When the weight of a waste cement accumulated in the small reservoir reaches a certain value such that the pressure of the waste accumulated is greater than the platen support force, resulting in the platen to open the door downwards, and the sludge may be moved down to aqueous layer. Further, the sludge may be dropped down to start the lower runner and sliding door. Further, the platen door may be placed on the external for manual pulling (as a handle) or a contact switch for standby.

Further, the high density solid may be discharged to the concentrated sludge treatment tank. Further, the wastewater and lower density sludge may be discharged to the wastewater purification zone processing pool.

Further, the present disclosure describes systems, methods, and apparatus for facilitating purification of sludge and tailing. Further, the present disclosure may include procedures for wastewater purification of mine tailing and municipal sludge with energy-saving, time-saving, manpower saving, low land occupation, low-carbon footprint, and low operation cost. Further, water content in the municipal sludge is usually as high as 75 to 99.9%, often including i) Floats & Oil Esters, ii) Heavy metal (copper, zinc, cadmium, chromium, iron, etc.) & manganese pollution, iii) Chemical & organic contamination, such as polychlorinated biphenyls (PCBs), Dioxin, etc., iv) Microbial & Parasitic Pollution, v) High doses of nitrogen, phosphorus, potassium residues, etc.

Further, the above treatment procedure often causes secondary pollution and the global warming greenhouse effect also. ($CO_2$, $CH_4$, Water pollution, etc.) Further, the procedure may include physical methods such as storage, mixing, crushing, sedimentation, floatation, membrane method, and activated carbon (sand) filtration. Further, the procedure may include chemical methods such as chemical conditioning and heat treatment. Further, the procedure may include biological methods such as aerobic digestion and anaerobic fermentation.

Further, the procedure may include the water purification design of sludge and mine tailing. Further, the procedure does not include a city silt fence section. Further, the city silt fence section blocks all kinds of bones, wood, plastic, glass, metal blocks, etc. Further, the procedure may include a procedure for the collection of dried mud (slurry, sludge, mine tailing, etc.) and parts of heavy metal elements. Further, the procedure makes use of civil engineering design (such as using concrete floors with porous block tiles integrated MBR module), combined with gravity and pressure principle, the use of water velocity pressure, perform energy-saving automated operation and "valves" switching system design, placing layers were measured with sensor monitoring linked to computer control, in order to solve the problem. Further, the procedure may include salvaging of oil floats and esters salvage through precipitation tanks. After, the removal of the oil floats and the esters the procedure may include drying of the concentration of heavy density for mud withdrawing, and low density with wastewater from the ground into the bottom surface of two blocks of wasted water purification zone (WWP) and solids sludge treatment zone (SST) using spiral classifiers with dewatering press. Further, the treatment tank and the Spiral Classifiers are all shrouded in a negative pressure condition, resulting in the odor not being leaked. The software program automatically calculates and controls the sludge discharge speed, drops the pressure value, etc. by controlling the flow gate. Further, the flow gate facilitates the discharging of sludge into the treatment tank. Further, the procedure is employed in an apparatus. Further, the apparatus may include a vertical treatment tank (to reduce the occupied floor area). Further, the treatment tank allows for the sludge that is collected to be layered, and the gradual penetration of wastewater sludge by gravity down. Further, the treatment tank may include layered treatment tanks (B1, B2, B3, B4, and B5), the bottom of each layer (B1, B2, and B4) except B3 and B5 comprises filtering holes. Further, the filtering holes provide for the nebula distribution and the bottom layer of the pool is water. Except for B1 (dissolved & flotation tank), B4 (Water Nutrient Removal Pool), and B5 (Reservoir), there are two replicated B2, B3 respectively in wasted water purification zone (WWP) & solids sludge treatment zone (SST). Further, the WWP set up B2, B3 for water treatment and the SST set up B2, B3 for sludge treatment. Further, the B2 of SST (solids sludge treatment zone) only set up with the function of thermal hydrolysis called SST-B2-TH (without the function of centrifugal vortex).

WWW-B2 may include WWW-B2C and WWW-B2TH (WWW-B2C-wasted water purification zone for centrifugal vortex and WWW-B2TH-wasted water purification zone for thermal hydrolysis called WWW-B2TH). Further, the WWW-B2 may output to WWW-B3-1(wasted water purification zone for anaerobic digestion) then following the procedure of WWW-B3-2, WWW-B3-3 to B4 (exit to SST-B2TH again if there are some floc or solid sludge). The floc (solid sludge) of WWW-B2 (WWW-B2C, WWW-B2TH) output to SST-B3-1 (solids sludge treatment zone for anaerobic digestion), then following the procedure of SST-B3-2(solid sludge treatment zone for anaerobic digestion), SST-B3-3(solid sludge treatment zone for aerobic digestion). Water to B4 if any water concentrates. (Agglomeration of high concentration particles output to spiral classifiers and dewatering press for drying, then moving into a truck). The sludge of SST-B2TH output to SST-B3-1 (solids sludge treatment zone for anaerobic digestion), then following the procedure of SST-B3-2, SST-B3-3. The water output of SST-B3-3 to B4, the floc to be Spiral Classifiers and dewatering press for drying, then moving into the truck) b) The diameter of each hole is different, the smaller diameter of the bottom hole (Grid disposal) c) Hole built by concrete floor with porous block tile integrated MBR module. To allow silt mud section, depending on the size made of different shape cohesion, are at different levels of space denial.

The below design allows for energy-saving/efficiently digest (time-saving for digestion) of over 50% with respect to the current design. 2) Using the principle of bucket & drip, silt moisture, and finer sediment, automatically through the hole to the lower layer. a) Each layer is designed to be inclined (high side A, low side B) ramps so that the deposited sediment mud (which cannot fall through the hole in the layer) is easier to slide to the lower side B Anchors. b) Low side B design & build the broom. Further, the broom of mud is not applied downward; it is stuck at the B side—the lower part of the slope inclined height A to the lower B, both sides designed the track to release pull broom from side A to the side B. Further, pushing the handle with a tension stainless steel spring to lock at B (Anchors). Layer such that the processing tank: the cast continues moving without the pressure of the sludge, through a tension spring, push the broom to back B from A. At the same time the mud layer deposition, to concentrate at B moving to another collecting space. Further, design the broom with eight claw puncture c) The high side of the A designed rope to be pushed the broom which is placed in the associated B. d) Design "Water Wheel" located in A position. When the sludge flow is put into the pressure generated by the treatment tank of this layer, and the pressure is increased. Further, the rope puller is started, and the pull handle is gradually pulled to the A. (Calculated & designed decentralized mud pressure caused by the momentum, the power metering formed is greater than stainless steel spring tension). Further, pushing the broom for moving the mud which will block the holes for making muds/wastewater driving smooth result in increase chance of falling to the bottom heavy sludge/wastewater is lowered and hit the wheel located at the side A, and the starting wheel rotates. Further, pulley rotates to pull the rope back. 3) In the inclined side B of the treatment tank, there is a vertical wall, from the bottom surface to dig a discharge port, to allow the accumulation of treatment tank (not moved to another through a hole at the bottom of tank) to reduce the water content of the sludge has discharged, to another collection tank sludge. Further, the vent designed valves allow the sludge inflow into the pool. Further, these valves close automatically, to prevent the sludge discharge directly. Further, the sludge through the discharge pipe and discharging it to the top of the sidewall of the pool hitting the top of the valves, gravity impact causes the valves to be automatically lowered (calculation of sludge discharge pressure gravity is greater than spring tension). There is a tension spring on the top of the valves—it is automatically pulled up when the sludge stops discharging. 4) The bottom of B1, B2 build a "small interlayer" between each layer of the treatment pool. This "small interlayer" function is used to control the discharge port of the next layer of treatment pool & the start switches of the push handle. Small interlayer also creates the function of thickening sludge through thin tube design. A small mezzanine level is formed into a mountain shape (the middle side is high on both sides of the landslide). Further, small reservoirs on both sides of the small interlayer, small particles of sludge in the upper treatment tank are concentrated in the two small reservoirs. There is a "platen door" on the small reservoir level. When the weight of the wasted cement accumulated small reservoir reaches a certain value, the pressure of wasted cement is greater than the platen support force, resulting in the platen downward to open the door, the sludge down the aqueous layer. Drop down to start the lower runner and sliding door. Place each "discharge door" "platen door" on the external manual pull handle contact switch (for stand by while pressure control occurs something wrong).

5) After municipal sludge through filtration shutter & sedimentation tank (located WWP-B1), the sludge (from the treated sludge discharge port of WWP-B1) through the tube conveyed to Spiral Classifiers located the position to SST-B1 for coarse sieve. Finally, high-density solids collected by a spiral classifier through dewatering press located SST-B1 for drying, then moving into the truck. Lower density solid with wasted water turns back to SST-B2-TH (solids sludge treatment zone for thermal hydrolysis). a) The bottom of Sedimentation (WWP-B) is an inclined shape (precipitated solid was collected on a right outlet, drain located in the left.—the two outlets of varying height) b) The spiral classifiers placed in the SST-B1. Spiral classifiers from WWP-B1 for solid sludge process, high-density solids discharged to the concentrated sludge treatment tank for dewatering press, and the wastewater and lower density sludge emissions down to the SST-B2-TH Processing Pool (Solid sludge treatment zone set up with the function of thermal hydrolysis called SST-B2-TH.) c) The wastewater of WWP-B1 to WWP-B2 6) Underground first layer B1 is a sedimentation tank (Also for oil separation). Ester and oil will float in the surface of the tank; the filter will collect the float. Sedimentation tank will dissolve & flotation those sludge (or tailing). Further, for B 1 there are 4 outlets namely filter drain pipe on the right above the treatment tank (settleable floc collected to SST-B2-TH/wasted water into WWW-B2). Further, treated sludge discharge port located at the bottom of the tank is inclined downward, into the collecting sludge tank (to spiral classifier). After sludge sedimentation, the wastewater flows from the bottom left and the discharge port flows into the lower layer WWW-B2-interface port of WWT-B/SST-B. Further, the robotic collector which includes membrane, filter, and storage will help to collect those floaters or oil esters. The robotic collector can move at or under the surface of sludge water to help the clearance of water. i. While the robotic collector is full-load, the robotic collector will be near the interface port of WWT-B1/SST-B1 for unload ii. Wasted water will go through the filter, membrane of robotic collector: (floc, ester, and oil) will be stored in the storage of robotic collector and water will pass through the body of the robotic collector out to pool again. iii. The robotic collector gets chips to puncture the obstruction of each hole located at the bottom of Pools. 7) The second layer of underground B2 is a centrifugal vortex pool and temperature regulation (thermal hydrolysis) (the micro-archaic floats in the air-loaded sewage to thicken sludge) a) The B1 sewage pipe with pressure infusion, the dispensing outlet gets several splits (calculated flow pressure) when the discharge is caused, the centrifugal effect is formed in WWW-B2-C b) The wastewater to reduce the solids content, more toward the next layer B3 stream c) B2 is divided into 2 parts: centrifugal vortex pool (located in top parts of Pool B2 called B2-C) and thermal hydrolysis pool(located in bottom parts of Pool B2 called B2-TH). d) centrifugal vortex pool: i) An area of fluid that surrounds a straight or curved axis in a certain direction. (This type of motion is called vortex flow.) Design the impact angle of the fluid from the outlet of the interlayer to strengthen the Vortex integrated with the principle of gravity and water impulse. Centrifugal vortex separates higher density impurities from water. ii) However, there is a hole between the layer of the centrifugal vortex pool and the thermal hydrolysis pool. The hole forms the effect of a vortex in the centrifugal pool (B2-C) due to Gravity and Earth's Rotation Effect. iii) In the middle of the hole, there is a "rotation axis" (the Diameter of the rotation axis is only ⅓ of a diameter of hole). The motor of the rotation axis is under the floor layer of the thermal hydrolysis pool, then through the hole to centrifugal vortex pool. (The power of the motor is with the recycle energy produced by the processor of Pool B3-2's CH4)—The function of the rotation axis is for increasing natural centrifugal effect (power) and homogeneous sample (samples may include liquid, slurry, sludge or trailing)—B1 sewage pipe with pressure infusion, the dispensing outlet get several splits (calculated flow pressure) for increasing natural vortex speed. Further, the higher density impurities are thrown out of the vortex by the principle of centrifugation. Most higher density impurities are sucked into the vortex bottom outlet. Further, different samples with different density will form a differential rotation phenomenon in eddy current. Further, pulped sludge (tailing) will be for thermal hydrolysis (thermal hydrolysis pool—SST-B2-TH). Further, wasted water will be for another pool (thermal hydrolysis pool-WWW-B2-TH) for thermal hydrolysis e) temperature regulation (thermal hydrolysis) may include commonly used hydrolysis coagulants: alum, sodium aluminate, ferrous sulfate with lime, chlorinated copperas, ferric chloride, ferric sulfate. Most of these coagulant consumables have huge daily expenses. Invented using "self-recycling energy" for "thermal hydrolysis" integrated with less costs alum or other coagulants for minimums ½ time and expense saving. Further, set up a monitoring sensor for the detection of temperature, turbidity, etc. at B2 Pool. Collection info feedback to processing & control center. Further, setting up a transport tube from outside to B2 for coagulants deliver. Further, heat from the processor through heat transport tube to B2 pool. Further, pressure from the processing center through pressure tube to B2-TH Pool from the processor. The adjustment of pressure can be controlled by the control center. Integrated info collected from monitoring sensors to make judgments for pressure control automated. Further, the high pressure and a sudden pressure release for B2-TH Pool may cause the good performance of thermal hydrolysis and allows more water-soluble impurities to solidify or floc to precipitate. Invented by automated calculation of the most suitable "Hydrolysis and Centrifugal Vortex Separation" operation design based on data which are collected from monitoring sensors to determine customization of the procedure through the control center program. For example, what temperature/pressure is best for high performance of hydrolysis through the detection of the monitoring sensor? Which is first for the process (Hydrolysis or Centrifugal Vortex?) or work together? What standard operation procedure (S.O.P) for operations of B2 Pool through data analysis? Included the calculation of residence time for hydrolysis. Vortex causes homogenization of coagulating solvents in Pool B. The homogenization will make the impurities in the wastewater more easily floc. Control center program set up by automated data analysis (Big Data) link with real-time monitoring sensor and detailed procedure of hydrolysis and centrifugal vortex. When the system accumulates more data, it will be able to operate more accurately and efficiently automatically. (Current solution can only be designed with rough probability for the procedure.) Like the growth of human ability after being educated. At least 2 times high efficiently than current thermal hydrolysis. Dilution of impurities in wastewater to a higher ratio. (minimum 50% more). Before entering anaerobic or aerobic digestion, you must ensure that plastic, glass or metal materials are removed first to avoid biogas blocked in B3. 8) The silt passes through the vertical different layer treatment tanks, the higher the water content is (the more the mud is removed), until the bottom second layer B3-1, A) B3 layer Lateral grid into three spaces B3-1, B3-2, B3-03, into a short to high order (flathead, but the depth is more deeply) can be placed microbial. The anaerobic digester is divided into two pools: B3-1 with acid-forming bacteria break down proteins and other macromolecules; Further B3-2 with other bacteria called methane forming bacteria, produce CO2, methane. (Anaerobic digesters may create temperature differences favored by different species of microorganisms—divided into two to four tanks. Moderate 30-38 degrees C.; 20-45 degrees C." or thermophilic temperatures "49-57 degrees C. or 70 degrees C." will cause differences in processing time. The thermophilic temperature will cause the anaerobic digestion time to be greatly reduced (more than three times the difference), and the gas output capacity will be greater higher CH4 content) B3-3 is aerobic digester. (B3-3 is divided into 2 sub-pools (B3-3T, B3-3G).—And B3 with "Air tube" (oxygen tube) to the ground (air input from the ground)—Air through Tube to B2, B3-3T by air processor PS: the aerobic digester (B3-3), centrifugal vortex pool (B2) and B1 Pool may be attached to an air tube (oxygen tube). For example, manganese will only dissolve into the water when it's in a state of hypoxia (if the water is full of oxygen, the manganese in the water can be diluted to facilitate collection). Further, exhaust pipe "(output CO 2, methane) CO2 to aquatic plant breeding area, CH4 to the processor for energy production. Aerobic digestion is a bacterial process that occurs in the presence of oxygen. Bacteria quickly consume organic matter and convert it into carbon dioxide, water and a range of low molecular weight. organic compounds. Since there is no new supply of organic matter from the sewage, the activated sludge biota began to die and was used as food by saprophytic bacteria. This stage of the process is called endogenous respiration, and it is a process that reduces the concentration of solids in the sludge. Anaerobic digestion is a series of processes by which microorganisms biodegrade in an environment lacking oxygen by four key stages include hydrolysis, acid production, acetic acid production, and methane production. Hydrolysis is an important link to anaerobic digestion. The entire process can be described by chemical reactions, in which organic materials such as glucose are biochemically digested by carbon dioxide (CO2) and methane (CH4) by anaerobic microorganisms. The substance digested by anaerobic bacteria cells should be more than ten times that of aerobic bacteria. This is why the high concentration of organic wastewater or sludge is often treated by anaerobic digestion, and therefore it is necessary for anaerobic digestion. Nutrients such as nitrogen and phosphorus are less, and the sludge after digestion is relatively reduced. Current anaerobic digester needs couple weeks "15-40 days in usual" (But solid digestion will be longer, and some wait time which called "residence time" is up to 90 days.) for fermentation in usual. During the metabolism of anaerobic bacteria, the growth of bacteria is slow due to the low energy produced. The generation time of bacteria is longer. Although aerobic digestion is 10 times faster if compare with anaerobic digestion, aerobic digestion needs a couple of days. The growth speed of bacteria relies on 2 factors—i) environmental factor ii) ii) the nutrients whether are appropriate.

About the environmental factors include temperature, water, pH Value, oxygen, water activity called "Aw", esp. temperature. (Aw=p/p0: where p is the partial vapor pressure of water in the solution, and p is the partial vapor pressure of pure water at the same temperature. If Aw is too low, microbiology is easy to die). Further, the methane discharge, through the processor, is injected into the burner to burn, and the heat is reversely transported into the heating pipe arranged in B2, B3-1-3 to regulate the optimal temperature of B2 and B3-1-3. Further, the B3-1, the B3-2, the B3-3 may set up a temperature/pH value monitoring sensor for temperature/pH value detection. Further, the processor will control the output of the heater for suitable temperature (Computer Control Center will give instruction for environmental requests—for example, temperature, pH Values . . . ). Further, the B3-3 is divided into 2 sub-pools (B3-3T, B3-3G). Further, the B3-3T (top part) links with an oxygen tube. B3-3G (Ground parts) is the sediment collection tank of B3-3T after aerobic fermentation. Further, a detector of the B2, the B3 for Pressure, pH Value, Temperature, Timidity, CO2, CH4, etc. Measurement link to control center for intelligent instruction. Further, introducing of light (or sunlight) to B3-3T from SST-B to help fermentation through refraction design of light. Further, the digestive fluid residues (digestate) after B3-3T (or B3-1, B3-2) digestion will move out to SST-B1. Further, MBR (Membrane Bio-Reactor) integrated with digestion to upgrade the efficiency of impurity removal of wasted water. Further, the B3 Set up "3 nutrient delivery tubes" and "3 bacteria delivery tubes" from process center for nutrient/bacteria transport to various parts of B3-1, B3-2, B3-3T. Nutrient delivery tubes will transport materials for pH Value adjustment also. (pH values will affect digestion time also.) For example, it is possible to use acid-producing bacteria to produce acid to lower pH values. Basic Nutrient Concepts as the below: B) B3-1, B3-2, B3-3 bottom without holes, only the intermediate of B3-1, B3-2, B3-3 has a port located in the bottom. c) Floating fine solid particle sludge collection. d) B3-3 wastewater goes down to B4. Invented the use of "create & adjust the environment and nutrients for microbial growth" in combination with "real-time inspection monitor sensor" for Anaerobic & Aerobic digester through the automated computing calculation & control of control center—More than five times faster than current digestion time. (Nutrients are Royal Biotech's business secrete). Further, precipitated solid or semi-solid (incl. floc solid) of WWW-B1, the B2, the B3-1, the B3-2, the B3-3G discharged to disposal of spiral classifiers and dewatering press dried into a truck 9) B4 Water Nutrient Removal Pool "nutrient removal" filters: Large pebbles Lime Pebbles Alum Stainless steel mesh Activated carbon (Active charcoal) Bamboo Brown Charcoal. Further, the detector of pH Value, Temperature, Timidity, BOD, COD, TOD measurement link to control center for future intelligent instruction enter the bottom reservoir B4. 10) Reservoir B5 (calculation of reservoir depth and pressure). Further, the detector of pH Value, Temperature, Timidity, BOD, COD, TOD measurement link to control center compare with the info collected from B4 for future intelligent instruction: a) In the UV-C (253.7 nm) is irradiated water outlet pipe+Disinfection by Chlorination (chloride), sterilized b) Design pumped mercury (siphon principle) for pumping 11) Water enters "aquatic plant breeding area" located the surface of these facilities (CO2 from B3-1,2 to this area). Further, moveable equipment can be created by the above designs also. Moveable Equipment will offer less cost solution of mining recovery caused volumes wasted water if by gravity, the floating method for mining recovery. The heavy metal recovery with gravity or floating method usually consumes very big volumes of water. Recycle water if water quality includes impurities will cause the recovery rate down. It means investment/return rate will be decreased.

Further, the control center may analyze detected data (such as oxygen content, fermentation performance, COD, BOD, TOD, etc.) and then issue optimization operation instructions (such as temperature (or heat) and nutrient ratio adjustment, etc.)

Referring now to figures, FIG. 1 is an apparatus 100 for facilitating purification of sludge and tailing, in accordance with some embodiments. Accordingly, the apparatus 100 may include a sedimentation unit 102, a centrifugal unit 104, a thermal hydrolysis unit 106, a digesting unit 108, a nutrient removal unit 110, and a reservoir unit 112.

Further, the sedimentation unit 102 may be configured for receiving at least one of sludge and tailing in a first tank 114. Further, the sedimentation unit 102 may be configured for separating wastewater from at least one of the sludge and the tailing based on density separation. Further, the sedimentation unit 102 may be configured for transferring the wastewater from the first tank 114 to a second tank 116 based on the separating. Further, the second tank 116 may include a primary compartment (not shown) and a secondary compartment (not shown). Further, the primary compartment and the secondary compartment are longitudinally aligned. Further, the primary compartment may be fluidly coupled with the secondary compartment using a coupling opening.

Further, the centrifugal unit 104 may be operationally coupled with the sedimentation unit 102. Further, the centrifugal unit 104 may be configured for creating a vortex in the wastewater based on the transferring of the wastewater from the first tank 114 to the second tank 116. Further, the transferring may include dispensing of the wastewater from a plurality of outlets (not shown) associated with the first tank 114 corresponding to a plurality of flow pressures for creating a centrifugal effect in wastewater in the primary compartment. Further, the creating of the vortex may include flowing of the wastewater from the primary compartment to the secondary compartment though the coupling opening. Further, the vortex separates at least one first impurity from the wastewater.

Further, the thermal hydrolysis unit 106 may be operationally coupled with the centrifugal unit 104. Further, the thermal hydrolysis unit 106 may be configured for coagulating at least one second impurity of the wastewater using a plurality of coagulants. Further, the thermal hydrolysis unit 106 may be configured for transferring the wastewater from the second tank 116 to a third tank 118 based on the coagulating.

Further, the digesting unit 108 operationally coupled with the thermal hydrolysis unit 106. Further, the digesting unit 108 may be configured for digesting at least one macromolecule of the wastewater into at least one compound based on the transferring of the wastewater from the second tank 116 to the third tank 118. Further, the digesting unit 108 may be configured for transferring the wastewater from the third tank 118 to a fourth tank 120 based on the digesting.

Further, the nutrient removal unit 110 may be operationally coupled with the digesting unit 108. Further, the nutrient removal unit 110 may be configured for filtering the wastewater from the at least one compound based on the transferring of the wastewater from the third tank 118 to the fourth tank 120.

Further, the nutrient removal unit 110 may be configured for transferring the wastewater from the fourth tank 120 to a fifth tank 122.

Further, the reservoir unit 112 may be operationally coupled with the nutrient removal unit 110. Further, the reservoir unit 112 may be configured for disinfecting the wastewater based on the transferring of the wastewater from the fourth tank 120 to the fifth tank 122. Further, the reservoir unit 112 may be configured for storing the wastewater in the fifth tank 122 based on the disinfecting.

Further, in some embodiments, the sedimentation unit 102 may be configured for separating a mud from at least one of the sludge and the tailing. Further, the mud separates from at least one of the sludge and the tailing in the first tank 114. Further, the sedimentation unit 102 may be configured for transferring the mud from the first tank 114 to a mud tank.

Further, the sedimentation unit 102 may be configured for extracting the wastewater and from the mud in the mud tank. Further, the sedimentation unit 102 may be configured for transferring the wastewater from the mud tank to the second tank 116.

Figure 2:
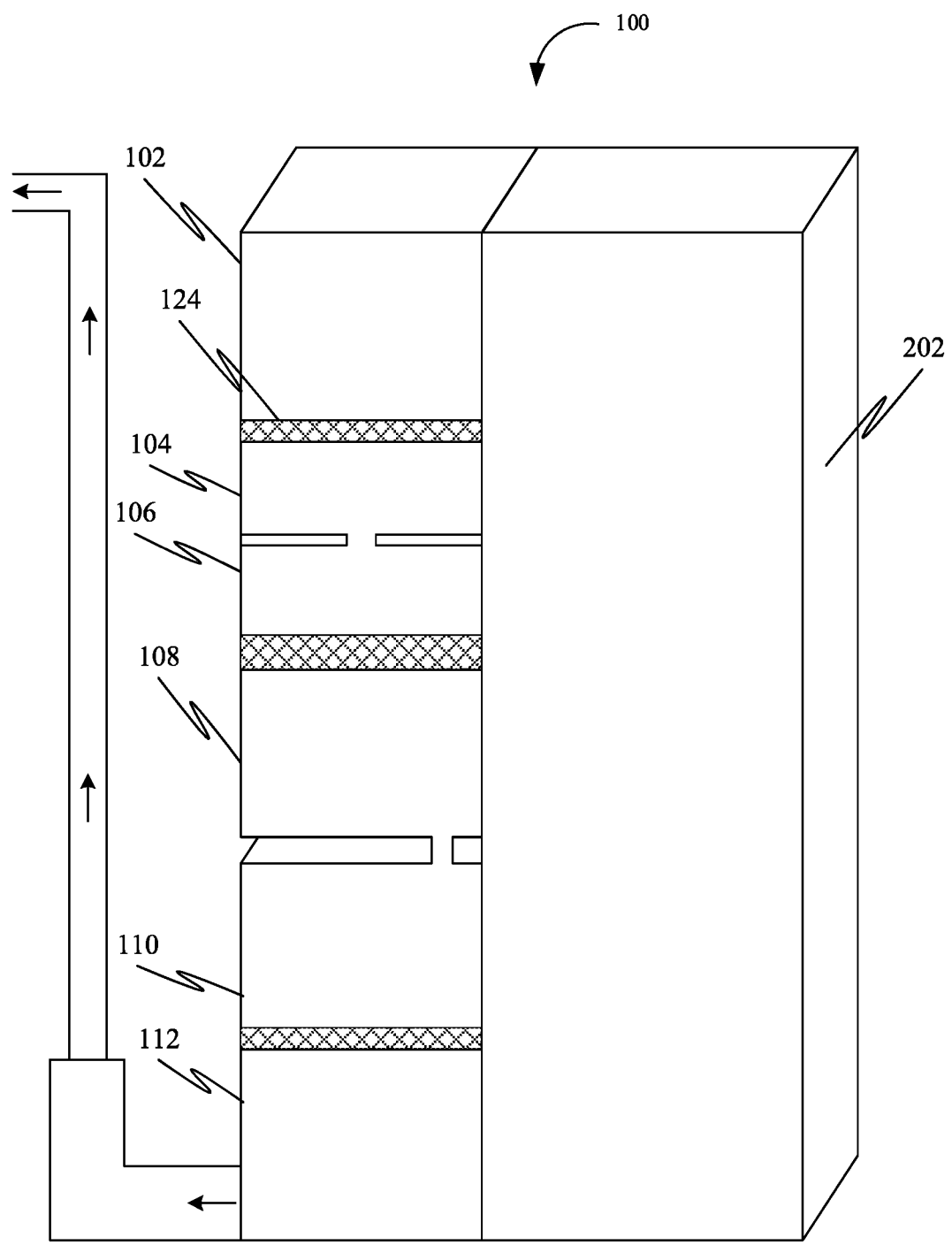
FIG. 2 is the apparatus for facilitating purification of sludge and tailing, in accordance with some embodiments.

Further, in some embodiments, the sedimentation unit 102 may be configured for removing at least one float from at least one of the sludge and the tailing. Further, the at least one float suspends in at least one of the sludge and the tailing in the first tank 114. Further, the sedimentation unit 102 may be configured for transferring the at least one float from the first tank 114 to a float tank 202 (as shown in FIG. 2). Further, the sedimentation unit 102 may be configured for extracting the wastewater and from the at least one float in the float tank 202. Further, the sedimentation unit 102 may be configured for transferring the wastewater from the float tank 202 to the second tank 116.

Further, in some embodiments, the receiving of at least one of the sludge and the tailing in the first tank 114 may be associated with a discharge rate. Further, the sedimentation unit 102 further configured for moderating the discharge rate of at least one of the sludge and the tailing through a valve (not shown) based on the receiving of at least one of the sludge and the tailing in the first tank 114.

Further, in some embodiments, the valve may be configured for controlling the discharge rate of at least one of the sludge and the tailing based on a quantity of at least one of the sludge and the tailing. Further, the valve may be characterized by a valve opening and a valve shutter. Further, the valve shutter opens the valve opening in at least one part corresponding to the quantity of at least one of the sludge and the tailing for controlling the discharge rate.

Figure 3:
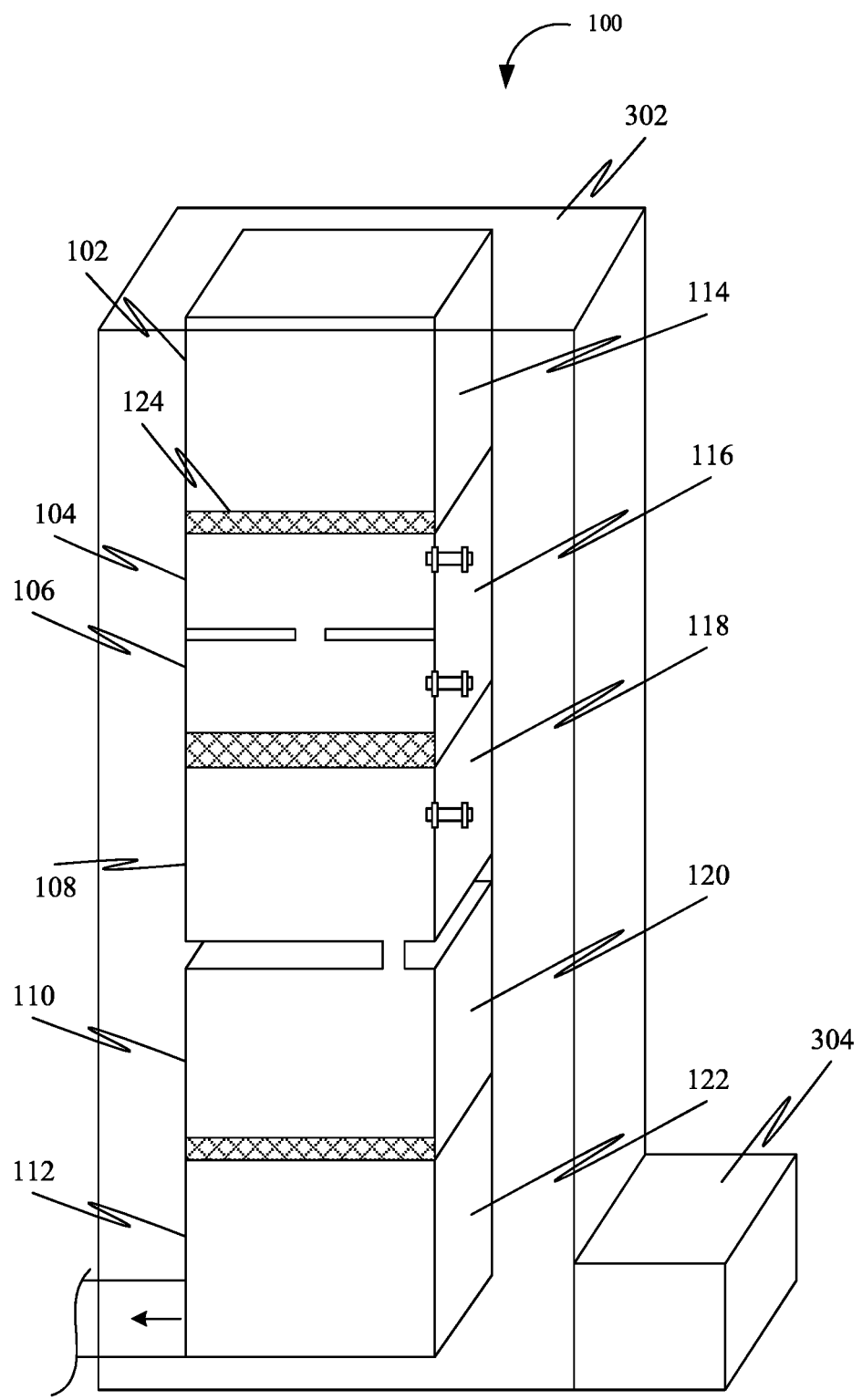
FIG. 3 is the apparatus for facilitating purification of sludge and tailing, in accordance with some embodiments.

In further embodiments, the apparatus 100 may include a containment enclosure 302 (as shown in FIG. 3) configured for enclosing the first tank 114, the second tank 116, the third tank 118, the fourth tank 120, and the fifth tank 122.

In further embodiments, the apparatus 100 may include a pressurizing unit 304 (as shown in FIG. 3) configured for depressurizing the containment enclosure 302. Further, the pressurizing unit 304 may be configured for storing containment air associated with the containment enclosure 302 in a containment tank (not shown) based on the depressurizing.

Further, in some embodiments, the pressurizing unit 304 may be further configured for routing the containment air in at least one of the second tank 116 and the third tank 118.

Further, in some embodiments, the sedimentation unit 102 may be further configured for sieving at least one primary impurity from the wastewater through a tank wall 124 of the first tank 114 based on the receiving. Further, the transferring of the wastewater from the first tank 114 to the second tank 116 may be based on the sieving.

Further, in some embodiments, the tank wall 124 may include at least one porous material. Further, the at least one porous material may be characterized by a plurality of holes corresponding to a plurality of hole diameters. Further, the plurality of holes facilitates the sieving of the at least one primary impurity. Further, an impurity diameter of the at least one primary impurity may be greater than the plurality of hole diameters.

Further, the first tank, the second tank, the third tank, the fourth tank, and the fifth tank may be longitudinally aligned.

FIG. 2 is the apparatus 100 for facilitating purification of sludge and tailing, in accordance with some embodiments.

FIG. 3 is the apparatus 100 for facilitating purification of sludge and tailing, in accordance with some embodiments.

Figure 4:
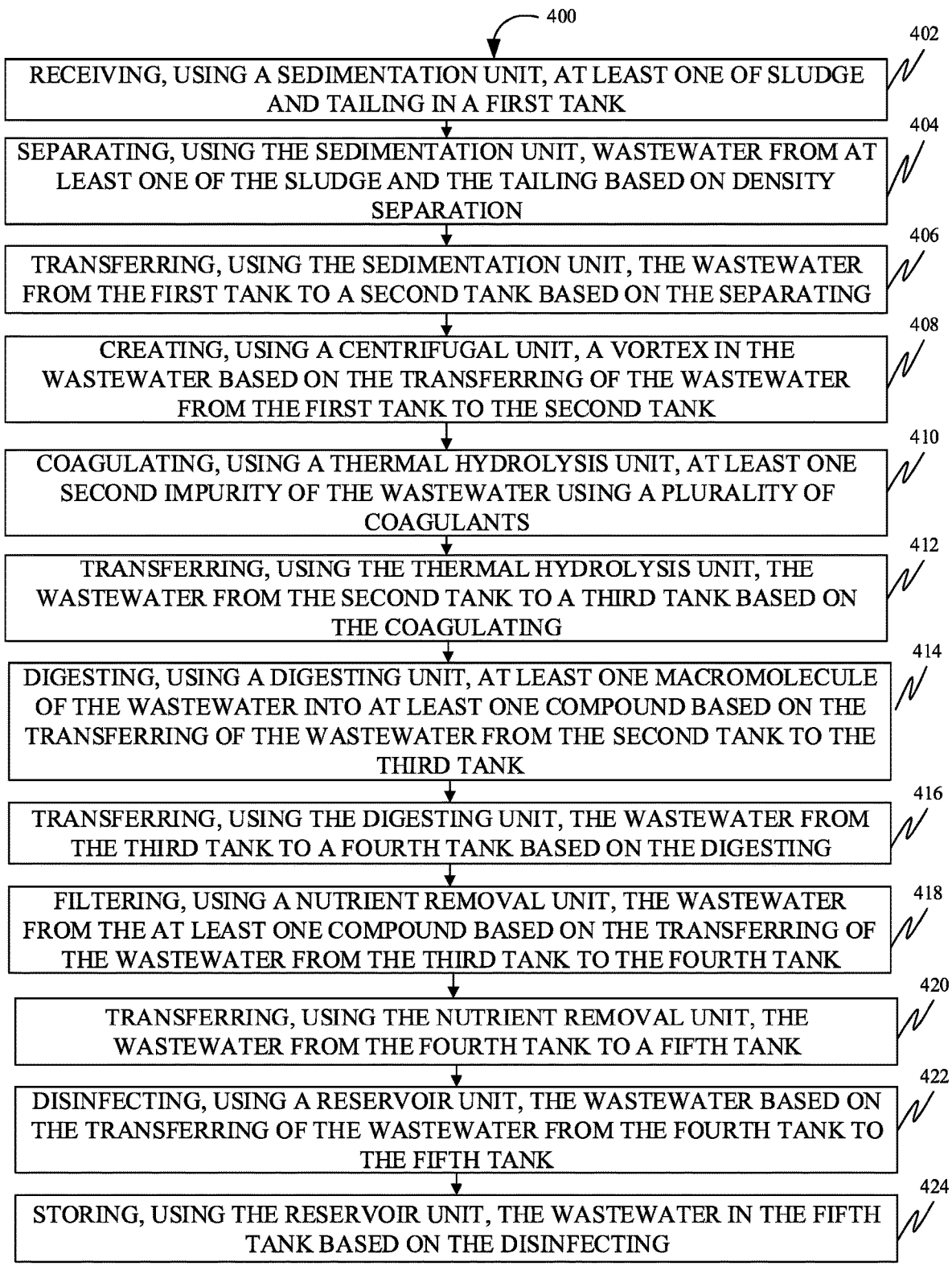
FIG. 4 is a flowchart of a method for facilitating purification of sludge and tailing, in accordance with some embodiments.

FIG. 4 is a flowchart of a method 400 for facilitating purification of sludge and tailing, in accordance with some embodiments. Accordingly, at 402, the method 400 may include a step of receiving, using a sedimentation unit, at least one of sludge and tailing in a first tank. Further, in an embodiment, the receiving of at least one of the sludge and the tailing in the first tank may be associated with a discharge rate. Further, the method may include moderating, using the sedimentation unit, the discharge rate of at least one of the sludge and the tailing through a valve based on the receiving of at least one of the sludge and the tailing in the first tank. Further, in an embodiment, the valve may be configured for controlling the discharge rate of at least one of the sludge and the tailing based on a quantity of at least one of the sludge and the tailing. Further, the valve may be characterized by a valve opening and a valve shutter. Further, the valve shutter opens the valve opening in at least one part corresponding to the quantity of at least one of the sludge and the tailing for controlling the discharge rate.

Further, at 404, the method 400 may include a step of separating, using the sedimentation unit, wastewater from at least one of the sludge and the tailing based on density separation.

Further, at 406, the method 400 may include a step of transferring, using the sedimentation unit, the wastewater from the first tank to a second tank based on the separating. Further, the second tank may include a primary compartment and a secondary compartment. Further, the primary compartment and the secondary compartment are longitudinally aligned. Further, the primary compartment may be fluidly coupled with the secondary compartment using a coupling opening.

Further, at 408, the method 400 may include a step of creating, using a centrifugal unit, a vortex in the wastewater based on the transferring of the wastewater from the first tank to the second tank. Further, the transferring may include dispensing of the wastewater from a plurality of outlets associated with the first tank corresponding to a plurality of flow pressures for creating a centrifugal effect in wastewater in the primary compartment. Further, the creating of the vortex may include flowing of the wastewater from the primary compartment to the secondary compartment though the coupling opening. Further, the vortex separates at least one first impurity from the wastewater.

Further, at 410, the method 400 may include a step of coagulating, using a thermal hydrolysis unit, at least one second impurity of the wastewater using a plurality of coagulants.

Further, at 412, the method 400 may include a step of transferring, using the thermal hydrolysis unit, the wastewater from the second tank to a third tank based on the coagulating.

Further, at 414, the method 400 may include a step of digesting, using a digesting unit, at least one macromolecule of the wastewater into at least one compound based on the transferring of the wastewater from the second tank to the third tank.

Further, at 416, the method 400 may include a step of transferring, using the digesting unit, the wastewater from the third tank to a fourth tank based on the digesting.

Further, at 418, the method 400 may include a step of filtering, using a nutrient removal unit, the wastewater from the at least one compound based on the transferring of the wastewater from the third tank to the fourth tank.

Further, at 420, the method 400 may include a step of transferring, using the nutrient removal unit, the wastewater from the fourth tank to a fifth tank.

Further, at 422, the method 400 may include a step of disinfecting, using a reservoir unit, the wastewater based on the transferring of the wastewater from the fourth tank to the fifth tank.

Further, at 424, the method 400 may include a step of storing, using the reservoir unit, the wastewater in the fifth tank based on the disinfecting.

In further embodiments, the method 400 may include sieving, using the sedimentation unit, at least one primary impurity from the wastewater through a tank wall of the first tank based on the receiving. Further, the transferring of the wastewater from the first tank to the second tank may be based on the sieving.

Further, in an embodiment, the tank wall may include at least one porous material. Further, the at least one porous material may be characterized by a plurality of holes corresponding to a plurality of hole diameters. Further, the plurality of holes facilitates the sieving of the at least one primary impurity. Further, an impurity diameter of the at least one primary impurity may be greater than the plurality of hole diameters.

Further, the first tank, the second tank, the third tank, the fourth tank, and the fifth tank may be longitudinally aligned.

Figure 5:
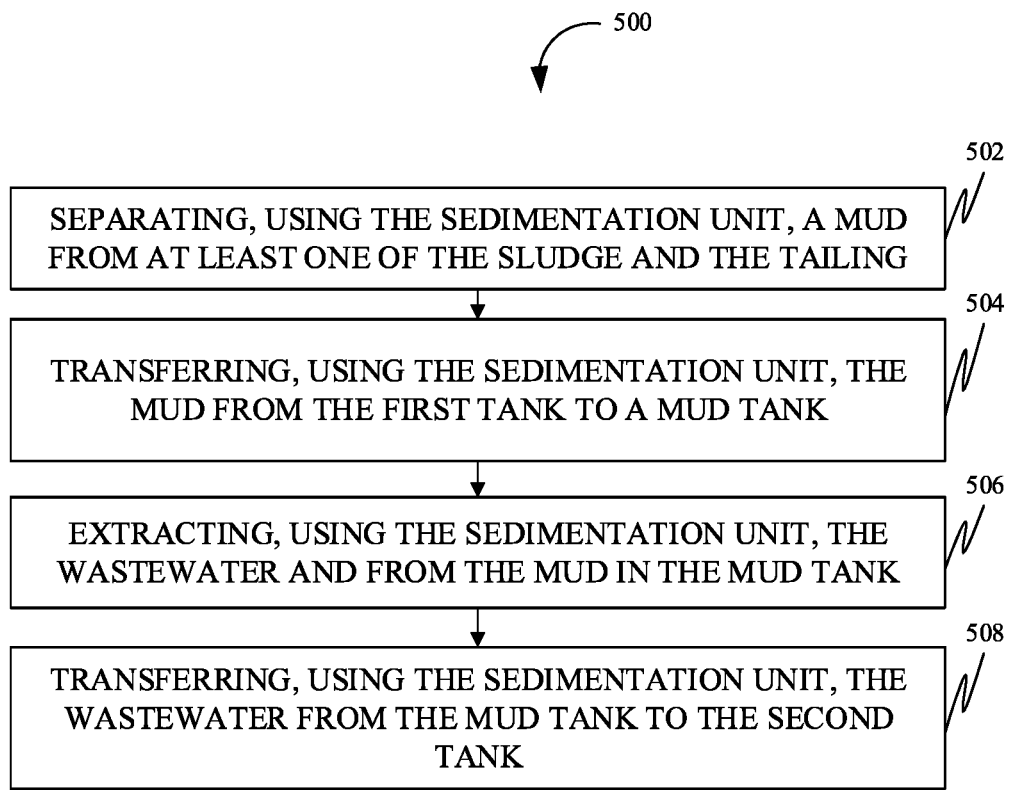
FIG. 5 is a flowchart of a method for facilitating extraction of the wastewater from mud, in accordance with some embodiments.

FIG. 5 is a flowchart of a method 500 for facilitating extraction of the wastewater from mud, in accordance with some embodiments. Accordingly, at 502, the method 500 may include a step of separating, using the sedimentation unit, a mud from at least one of the sludge and the tailing. Further, the mud separates from at least one of the sludge and the tailing in the first tank.

Further, at 504, the method 500 may include a step of transferring, using the sedimentation unit, the mud from the first tank to a mud tank.

Further, at 506, the method 500 may include a step of extracting, using the sedimentation unit, the wastewater and from the mud in the mud tank.

Further, at 508, the method 500 may include a step of transferring, using the sedimentation unit, the wastewater from the mud tank to the second tank.

Figure 6:
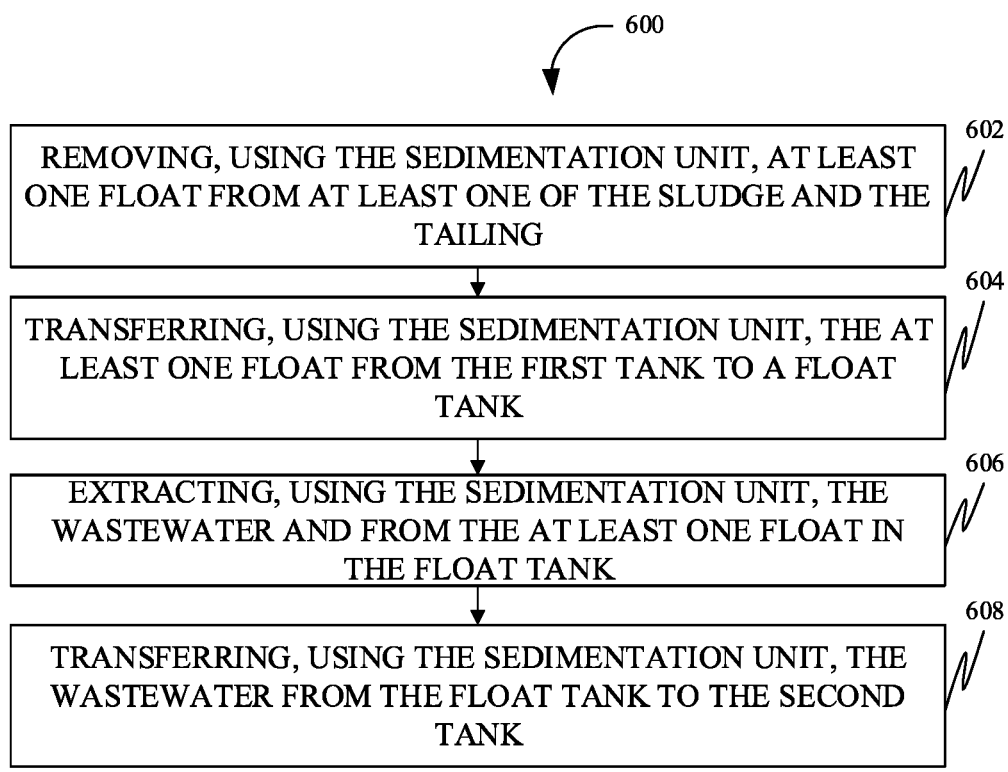
FIG. 6 is a flowchart of a method for facilitating extracting of the wastewater from floats, in accordance with some embodiments.

FIG. 6 is a flowchart of a method 600 for facilitating extracting of the wastewater from floats, in accordance with some embodiments. Accordingly, at 602, the method 600 may include a step of removing, using the sedimentation unit, at least one float from at least one of the sludge and the tailing. Further, the at least one float suspends in at least one of the sludge and the tailing in the first tank.

Further, at 604, the method 600 may include a step of transferring, using the sedimentation unit, the at least one float from the first tank to a float tank.

Further, at 606, the method 600 may include a step of extracting, using the sedimentation unit, the wastewater and from the at least one float in the float tank.

Further, at 608, the method 600 may include a step of transferring, using the sedimentation unit, the wastewater from the float tank to the second tank.

Figure 7:
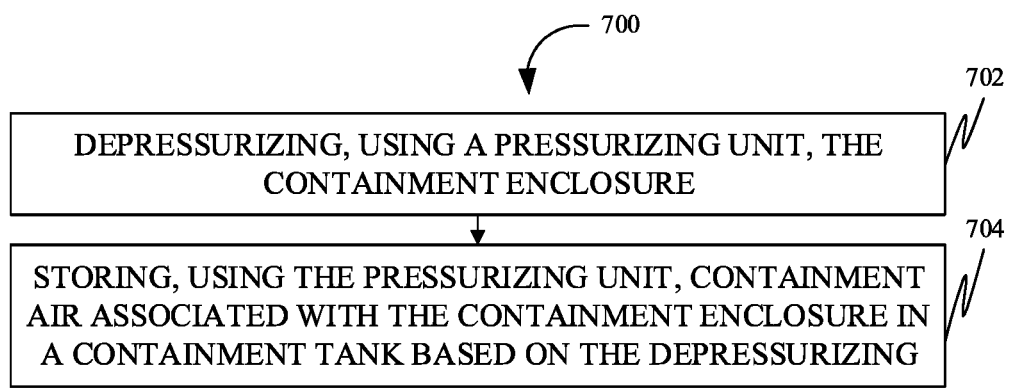
FIG. 7 is a flowchart of a method for facilitating routing of air from an enclosure to at least one tank, in accordance with some embodiments.

FIG. 7 is a flowchart of a method 700 for facilitating routing of air from an enclosure to at least one tank, in accordance with some embodiments. Accordingly, the first tank, the second tank, the third tank, the fourth tank, and the firth tank may be disposed of in a containment enclosure.

Further, at 702, the method 700 may include a step of depressurizing, using a pressurizing unit, the containment enclosure.

Further, at 704, the method 700 may include a step of storing, using the pressurizing unit, containment air associated with the containment enclosure in a containment tank based on the depressurizing.

In further embodiments, the method 700 may include routing, using the pressurizing unit, the containment air in at least one of the second tank and the third tank.

Figure 8:
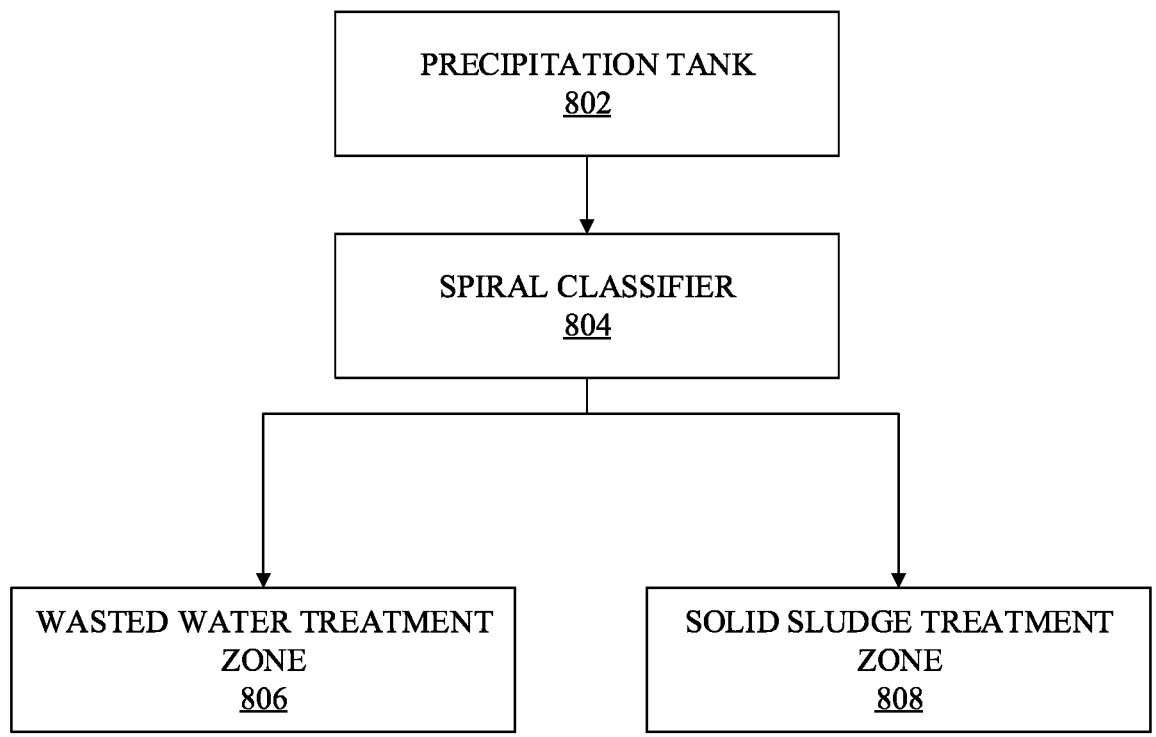
FIG. 8 is a flow diagram showing the overall layout for facilitating wastewater purification of municipal sludge and mine tailing, in accordance with some embodiments.

FIG. 8 is a flow diagram showing the overall layout for facilitating wastewater purification of municipal sludge and mine tailing, in accordance with some embodiments. Accordingly, the oil floats and esters salvage away through a precipitation tank 802. Further, a spiral classifier 804 with dewatering press dried the concentration of heavy density mud that may be withdrawn, and low density with wastewater from the ground into a bottom surface. Further, the bottom surface may include two zones (or blocks), namely, wasted water purification zone (WWP) 806 and solid sludge treatment zone (SST) 808. Further, at least one of the wasted water purification zone (WWP) 806 and the solid sludge treatment zone (SST) 808 may be constructed is a negative pressure space. Further, the treatment tank and the spiral classifier 804 are all shrouded in a negative pressure condition, resulting in the odor not being leaked.

Figure 9:
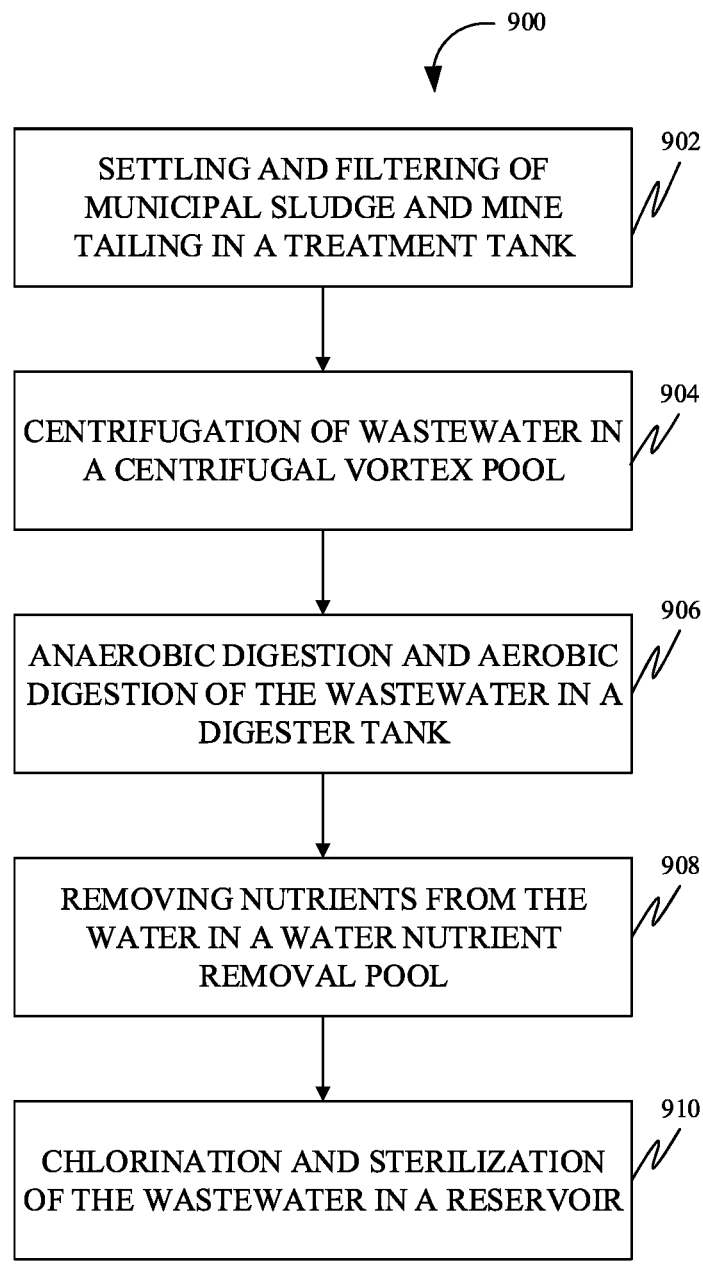
FIG. 9 is a flowchart of a method for facilitating wastewater purification of municipal sludge and mine tailing in a wastewater treatment zone, in accordance with some embodiments.

FIG. 9 is a flowchart of a method 900 for facilitating wastewater purification of municipal sludge and mine tailing in a wastewater treatment zone, in accordance with some embodiments. Accordingly, at 902, the method 900 may include a step of settling and filtering of the municipal sludge and the mine tailing in a treatment tank. Further, the municipal sludge may be received from spiral classifiers located at a solid sludge treatment zone for coarse sieve. Further, the treatment tank may include an inclined shaped bottom. Further, the inclined shape of the treatment tank may facilitate the collection of precipitated solid on a right outlet and drain may be located in the left (the two outlets with varying height). Further, the inclined shape of the treatment tank may increase the area available for settlement of the municipal sludge and mine tailing. Further, an ester and oil may float on the surface of the tank and a filter shutter may collect the float. Further, the treatment tank may include three outlets. Further, a first outlet of the three outlets may include a filter drain pipe on the right, above the treatment tank. Further, the second outlet may include a treated sludge discharge port located at the bottom of the treatment tank. Further, a second outlet of the three outlets may discharge the treated sludge into a collecting sludge tank. Further, a third outlet of the three outlets may be located to the bottom left of the treatment tank that may facilitate wastewater to flow towards a centrifugal vortex pool.

Further, at 904, the method 900 may include a step of centrifugation of the wastewater in the centrifugal vortex pool. Further, the centrifugal vortex pool may facilitate regulating the temperature of the wastewater through thermal hydrolysis (the micro-archaic floats in the air-loaded sewage to thicken sludge). Further, the third outlet of the treatment tank may infuse pressure difference in the wastewater while discharging, thereby, creating a centrifugal effect in the centrifugal vortex pool. Further, the wastewater with reduced solid content may be moved towards a digester tank.

Further, at 906, the method 900 may include a step of anaerobic digestion and aerobic digestion of the wastewater in the digester tank. Further, the digester tank may be divided into three spaces consisting of an anaerobic digester and an aerobic digester. Further, the anaerobic digester may include two pools. Further, the two pools may include a pool 1 and a pool 2. Further, the pool 1 may facilitate breaking down proteins and other macromolecules of the wastewater in the absence of air with acid-forming bacteria. Further, the pool 2 may facilitate other bacteria to produce carbon dioxide ($CO_2$) and methane ($CH_4$). Further, the aerobic digester may be attached to an air tube (oxygen tube). Further, the digester tank may include an exhaust pipe that may discharge carbon dioxide and methane. Further, the methane may be discharged through the processor and thereby, injected into a burner to burn and generate heat. Further, the heat may be reversely transported into a heating pipe to regulate the optimal temperature of the centrifugal vortex pool, pool 1 of the anaerobic digester, and the aerobic digester. Further, the pool 1 and pool 2 associated with the anaerobic digester, and the aerobic digester may include the bottom surface without holes (except intermediate of the anaerobic digester and the aerobic digester). Further, the floating fine solid particle sludge may be collected in the collecting sludge tank. Further, the wastewater with reduced solid content may be moved towards a water nutrient removal pool.

Further, at 908, the method 900 may include a step of removing nutrients from the water in the water nutrient removal pool. Further, the water nutrient removal pool may include nutrient removal filters such as, but not limited to, large pebbles, limes, pebbles, alum, stainless steel mesh, activated carbon (active charcoal), bamboo brown, charcoal, etc. Further, the treated wastewater may be moved towards a reservoir.

Further, at 910, the method 900 may include a step of chlorination and sterilization of the wastewater in the reservoir. Further, the reservoir may be associated with a fixed depth and pressure. Further, the wastewater may be chlorinated (using chlorides) and sterilized in the UV-C (253.7 nm) to remove disinfectants from the wastewater. Further, the treated wastewater may be pumped into a storage tank. Further, the method 900 may utilize the siphon principle, thereby, preventing the liquid from going down from having contact with the liquid going up, and thereby preventing liquid tensile strength from pulling the liquid up. Further, the treated wastewater may be transported (or fed) to an aquatic plant bleeding area.

Figure 10:
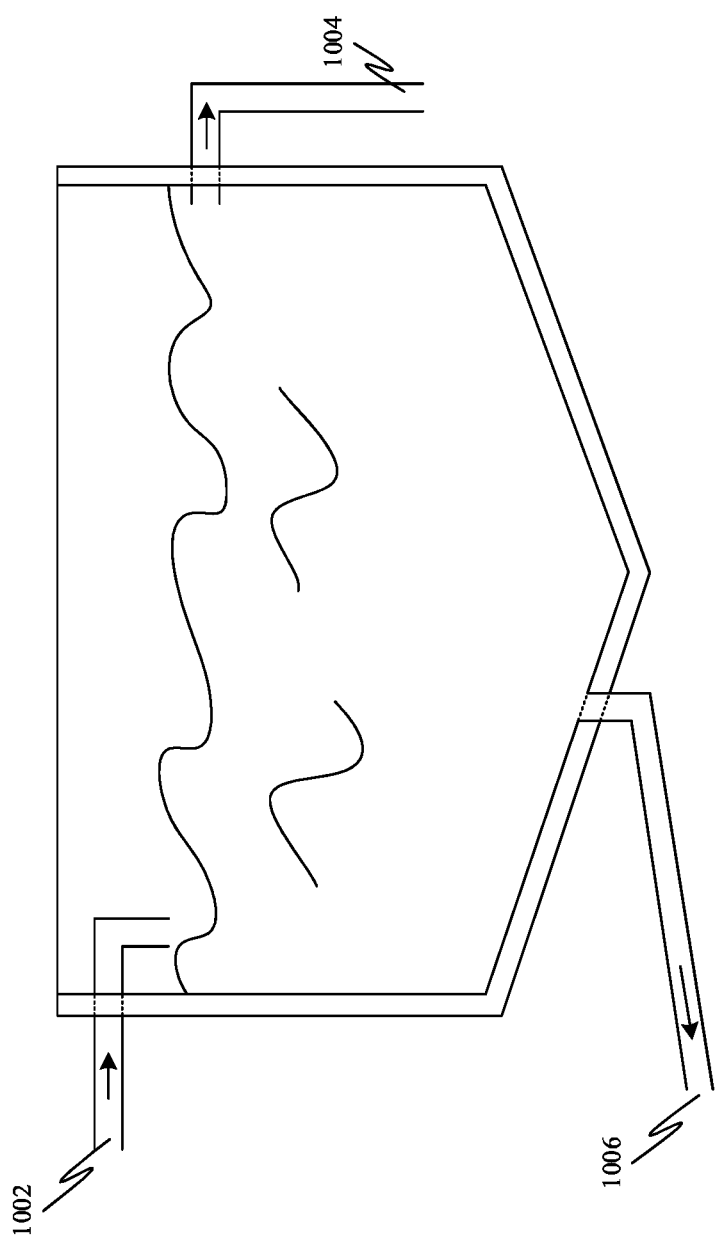
FIG. 10 is a front view of a treatment tank for settlement of municipal sludge and mine tailing, in accordance with some embodiments.

FIG. 10 is a front view of a treatment tank 1000 for settlement of municipal sludge and mine tailing, in accordance with some embodiments. Further, the treatment tank 1000 may include an inlet port 1002, an outlet port 1004, and a sludge outlet port 1006.

Figure 11:
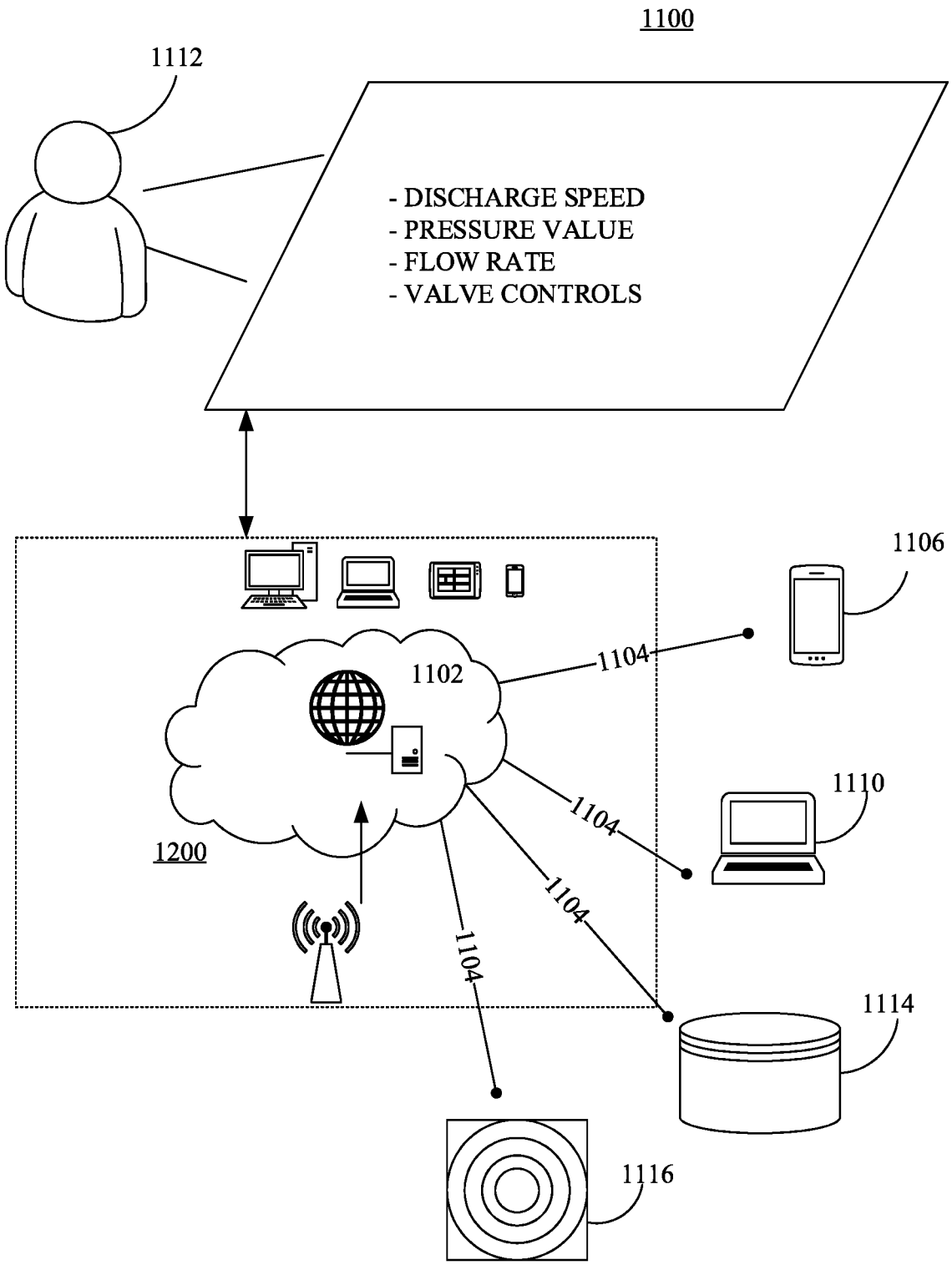
FIG. 11 is an illustration of an online platform consistent with various embodiments of the present disclosure.

FIG. 11 is an illustration of an online platform 1100 consistent with various embodiments of the present disclosure. By way of non-limiting example, the online platform 1100 to facilitate purification of sludge and tailing may be hosted on a centralized server 1102, such as, for example, a cloud computing service. The centralized server 1102 may communicate with other network entities, such as, for example, a mobile device 1106 (such as a smartphone, a laptop, a tablet computer, etc.), other electronic devices 1110 (such as desktop computers, server computers, etc.), databases 1114, and sensors 1116 over a communication network 1104, such as, but not limited to, the Internet. Further, users of the online platform 1100 may include relevant parties such as, but not limited to, end-users, administrators, service providers, service consumers and so on. Accordingly, in some instances, electronic devices operated by the one or more relevant parties may be in communication with the platform.

A user 1112, such as the one or more relevant parties, may access online platform 1100 through a web-based software application or browser. The web-based software application may be embodied as, for example, but not be limited to, a website, a web application, a desktop application, and a mobile application compatible with a computing device 1200.

Figure 12:
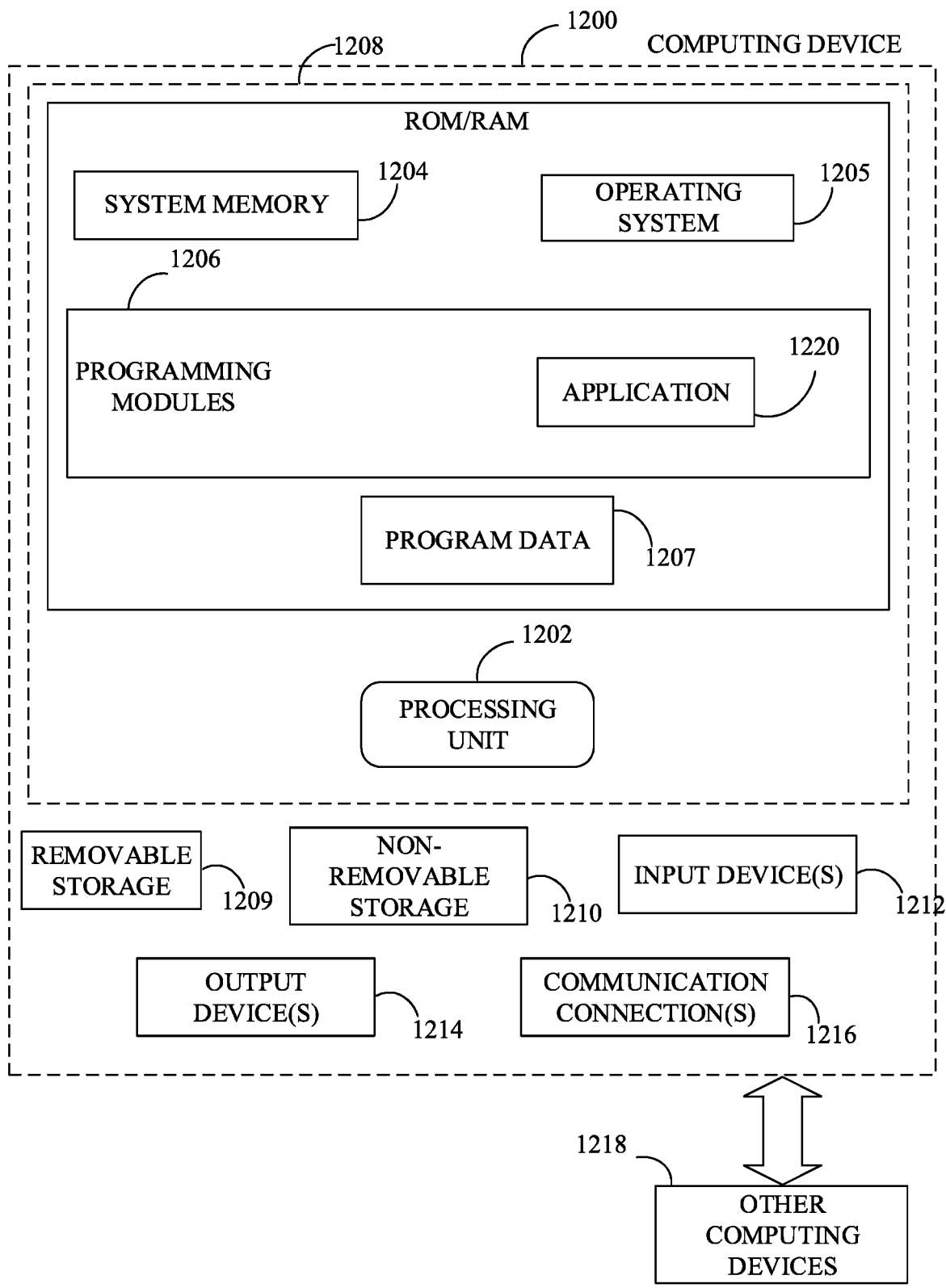
FIG. 12 is a block diagram of a computing device for implementing the methods disclosed herein, in accordance with some embodiments.

With reference to FIG. 12, a system consistent with an embodiment of the disclosure may include a computing device or cloud service, such as computing device 1200. In a basic configuration, computing device 1200 may include at least one processing unit 1202 and a system memory 1204. Depending on the configuration and type of computing device, system memory 1204 may comprise, but is not limited to, volatile (e.g. random-access memory (RAM)), non-volatile (e.g. read-only memory (ROM)), flash memory, or any combination. System memory 1204 may include operating system 1205, one or more programming modules 1206, and may include a program data 1207. Operating system 1205, for example, may be suitable for controlling computing device 1200's operation. Furthermore, embodiments of the disclosure may be practiced in conjunction with a graphics library, other operating systems, or any other application program and is not limited to any particular application or system. This basic configuration is illustrated in FIG. 12 by those components within a dashed line 1208.

Computing device 1200 may have additional features or functionality. For example, computing device 1200 may also include additional data storage devices (removable and/or non-removable) such as, for example, magnetic disks, optical disks, or tape. Such additional storage is illustrated in FIG. 12 by a removable storage 1209 and a non-removable storage 1210. Computer storage media may include volatile and non-volatile, removable and non-removable media implemented in any method or technology for storage of information, such as computer-readable instructions, data structures, program modules, or other data. System memory 1204, removable storage 1209, and non-removable storage 1210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1200. Any such computer storage media may be part of device 1200. Computing device 1200 may also have input device(s) 1212 such as a keyboard, a mouse, a pen, a sound input device, a touch input device, a location sensor, a camera, a biometric sensor, etc. Output device(s) 1214 such as a display, speakers, a printer, etc. may also be included. The aforementioned devices are examples and others may be used.

Computing device 1200 may also contain a communication connection 1216 that may allow device 1200 to communicate with other computing devices 1218, such as over a network in a distributed computing environment, for example, an intranet or the Internet. Communication connection 1216 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 1204, including operating system 1205. While executing on processing unit 1202, programming modules 1206 (e.g., application 1220 such as a media player) may perform processes including, for example, one or more stages of methods, algorithms, systems, applications, servers, databases as described above. The aforementioned process is an example, and processing unit 1202 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may, in fact, be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A method for facilitating purification of sludge and tailing, the method comprising: receiving, using a sedimentation unit, at least one of sludge and tailing in a first tank disposed of in a containment enclosure; separating, using the sedimentation unit, wastewater from at least one of the sludge and the tailing; transferring, using the sedimentation unit, the wastewater from the first tank to a second tank, wherein the second tank comprises a primary compartment and a secondary compartment, wherein the primary compartment is fluidly coupled with the secondary compartment, wherein the second tank is disposed of in the containment enclosure; creating, using a centrifugal unit, a vortex in the wastewater, wherein the creating of the vortex comprises flowing of the wastewater from the primary compartment to the secondary compartment, wherein the vortex separates at least one first impurity from the wastewater; coagulating at least one second impurity of the wastewater using a plurality of coagulants; transferring the wastewater from the second tank to a third tank, wherein the third tank is disposed of in the containment enclosure; digesting, using a digesting unit, at least one macromolecule of the wastewater into at least one compound; transferring, using the digesting unit, the wastewater from the third tank to a fourth tank wherein the fourth tank is disposed of in the containment enclosure; filtering, using a nutrient removal unit, the wastewater from the at least one compound; transferring, using the nutrient removal unit, the wastewater from the fourth tank to a fifth tank disposed of in the containment enclosure; disinfecting, using a reservoir unit, the wastewater; storing, using the reservoir unit, the wastewater in the fifth tank; depressurizing, using a pressurizing unit, the containment enclosure; and storing, using the pressurizing unit, containment air associated with the containment enclosure in a containment tank.

2. The method of claim 1 further comprising:
   removing, using the sedimentation unit, at least one float from at least one of the sludge and the tailing, wherein the at least one float suspends in at least one of the sludge and the tailing in the first tank;
   transferring, using the sedimentation unit, the at least one float from the first tank to a float tank;
   extracting, using the sedimentation unit, the wastewater and from the at least one float in the float tank; and
   transferring, using the sedimentation unit, the wastewater from the float tank to the second tank.

3. The method of claim 1, wherein the receiving of at least one of the sludge and the tailing in the first tank is associated with a discharge rate, wherein the method comprises moderating, using the sedimentation unit, the discharge rate of at least one of the sludge and the tailing.

4. The method of claim 1 further comprising routing, using the pressurizing unit, the containment air in at least one of the second tank and the third tank.

5. The method of claim 1 further comprising sieving, using the sedimentation unit, at least one primary impurity from the wastewater through a tank wall of the first tank.

6. The method of claim 5, wherein the tank wall comprises at least one porous material, wherein the at least one porous material is characterized by a plurality of holes corresponding to a plurality of hole diameters, wherein the plurality of holes facilitates the sieving of the at least one primary impurity, wherein an impurity diameter of the at least one primary impurity is greater than the plurality of hole diameters.

7. An apparatus for facilitating purification of sludge and tailing, the apparatus comprising: a sedimentation unit configured for: receiving at least one of sludge and tailing in a first tank; separating wastewater from at least one of the sludge and the tailing based; and transferring the wastewater from the first tank to a second tank, wherein the second tank comprises a primary compartment and a secondary compartment, wherein the primary compartment is fluidly coupled with the secondary compartment; a centrifugal unit operationally coupled with the sedimentation unit, wherein the centrifugal unit is configured for creating a vortex in the wastewater, wherein the transferring comprises dispensing of the wastewater from a plurality of outlets associated with the first tank corresponding to a plurality of flow pressures for creating a centrifugal effect in wastewater in the primary compartment, wherein the creating of the vortex comprises flowing of the wastewater from the primary compartment to the secondary compartment, wherein the vortex separates at least one first impurity from the wastewater; a thermal hydrolysis unit operationally coupled with the centrifugal unit, wherein the thermal hydrolysis unit is configured for transferring the wastewater from the second tank to a third tank; a digesting unit operationally coupled with the thermal hydrolysis unit, wherein the digesting unit is configured for: digesting at least one macromolecule of the wastewater into at least one compound; and transferring the wastewater from the third tank to a fourth tank; a nutrient removal unit operationally coupled with the digesting unit, wherein the nutrient removal unit is configured for: filtering the wastewater from the at least one compound; and transferring the wastewater from the fourth tank to a fifth tank; and a reservoir unit operationally coupled with the nutrient removal unit, wherein the reservoir unit is configured for: disinfecting the wastewater; storing the wastewater in the fifth tank; a containment enclosure configured for enclosing the first tank, the second tank, the third tank, the fourth tank, and the fifth tank; and a pressurizing unit configured for: depressurizing the containment enclosure; and storing containment air associated with the containment enclosure in a containment tank.

8. The apparatus of claim 7, wherein the sedimentation unit is further configured for:
- removing at least one float from at least one of the sludge and the tailing, wherein the at least one float suspends in at least one of the sludge and the tailing in the first tank;
- transferring the at least one float from the first tank to a float tank;
- extracting the wastewater and from the at least one float in the float tank; and
- transferring the wastewater from the float tank to the second tank.

9. The apparatus of claim 7, wherein the receiving of at least one of the sludge and the tailing in the first tank is associated with a discharge rate, wherein the sedimentation unit further configured for moderating the discharge rate of at least one of the sludge and the tailing.

10. The apparatus of claim 7, wherein the pressurizing unit is further configured for routing the containment air in at least one of the second tank and the third tank.

11. The apparatus of claim 7, wherein the sedimentation unit is further configured for sieving at least one primary impurity from the wastewater through a tank wall of the first tank.

12. The apparatus of claim 11, wherein the tank wall comprises at least one porous material, wherein the at least one porous material is characterized by a plurality of holes corresponding to a plurality of hole diameters, wherein the plurality of holes facilitates the sieving of the at least one primary impurity, wherein an impurity diameter of the at least one primary impurity is greater than the plurality of hole diameters.

* * * * *